United States Patent [19]
Burt

[11] Patent Number: 5,267,220
[45] Date of Patent: Nov. 30, 1993

[54] TARGET SURVEILLANCE AND DESTRUCT SYSTEM

[75] Inventor: Wayne E. Burt, Panama City, Fla.

[73] Assignee: The United States of America as represented by the Secretary of the Navy, Washington, D.C.

[21] Appl. No.: 818,187

[22] Filed: Apr. 18, 1969

[51] Int. Cl.⁵ .............................................. H04B 11/00
[52] U.S. Cl. .................................. 367/131; 114/316; 367/87
[58] Field of Search ................... 367/131, 87; 114/316

[56] References Cited

U.S. PATENT DOCUMENTS

| | | | |
|---|---|---|---|
| 2,353,360 | 7/1944 | Ronning | 114/200 X |
| 2,359,366 | 10/1944 | Katcher et al. | 114/235 |
| 2,987,893 | 6/1961 | Robinson, Jr. | 114/200 X |
| 3,084,652 | 4/1963 | Lager | 114/20 X |

*Primary Examiner*—Ian J. Lobo
*Attorney, Agent, or Firm*—William C. Townsend; Kenneth Dobyns

[57] ABSTRACT

A covert attacking swimmer is discovered and acquired by an echo-search apparatus. Once acquired, a search and destruct vehicle type weapon is launched which seeks out the attacking swimmer and when in range therewith shoots him with lethal electric fields or spears.

14 Claims, 2 Drawing Sheets

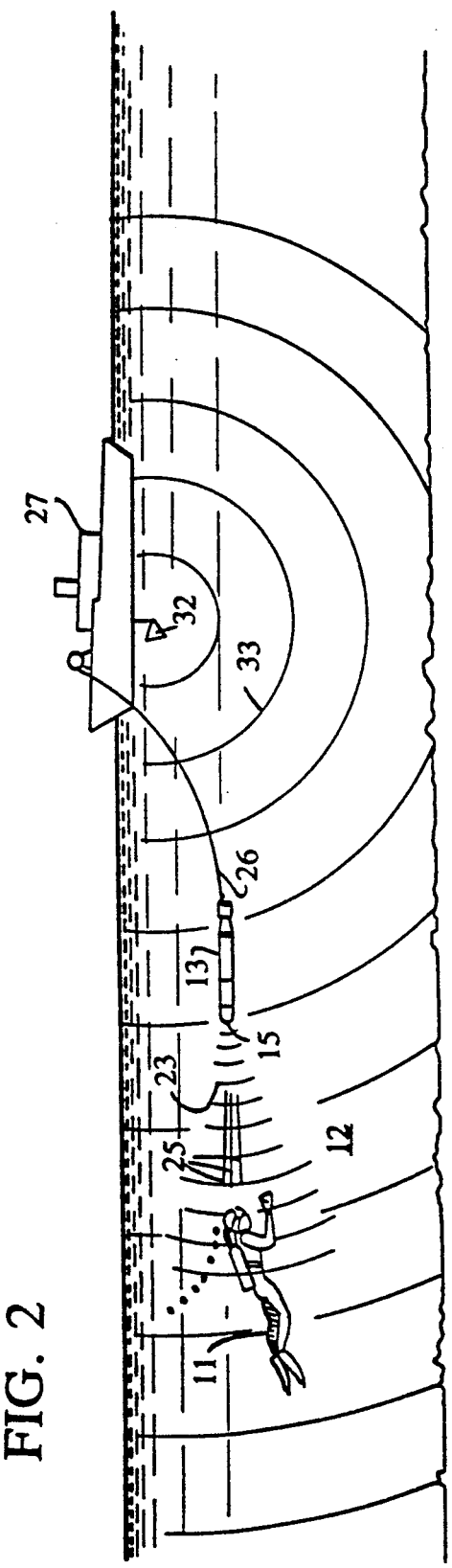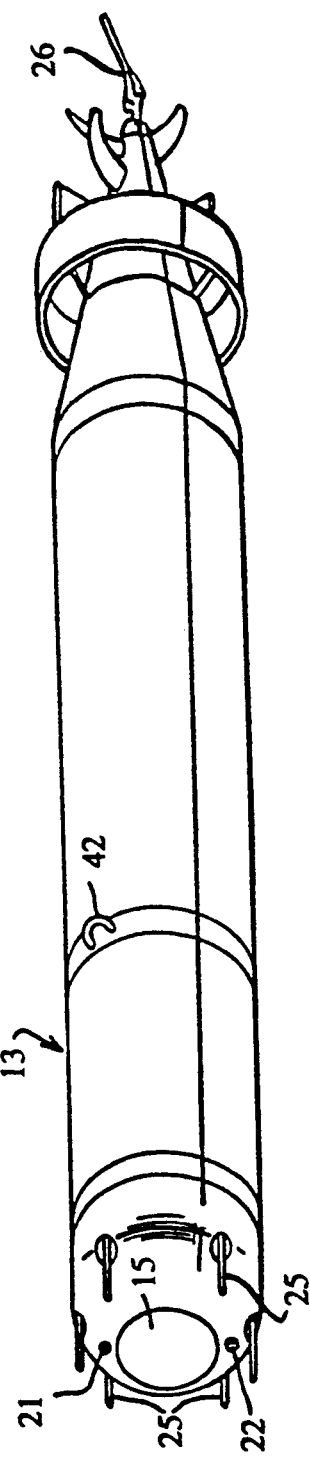

TARGET SURVEILLANCE AND DESTRUCT SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF INVENTION

The present invention relates generally to weapons systems and, in particular, is a system which searches for and acquires clandestine attacking swimmers by means of sonar apparatus and destroys them by means of accurately launched underwater projectiles and/or projected electrical fields.

The incidence of attack on and damage to anchored or moored vessels by covert swimmers has been considerable since the beginning of World War II. An underwater swimmer, appropriately suited, using the cover of darkness, carrying easily obtained inexpensive explosives, mines, or other suitable weapons, is often capable of causing great damage to ships and other marine vehicles or objects, and is sometimes able to destroy them completely. In addition, considerable loss of life may occur.

DESCRIPTION OF PRIOR ART

To date, no known foolproof method and means for defending against or counteracting such swimmers' activities exist. Sonars, of course, have been employed to search for and locate swimmers, and explosive charges have been detonated in proximity therewith.

Unfortunately, such procedures leave a great deal to be desired, especially since the detonation of explosive charges within shallow water disturbs sea floor or other sediments and causes gases to be released, which, in turn, causes bubbles to be formed, thereby effectively polluting the ambient water to the extent that visibility therewithin is poor. Consequently, the resulting water conditions are such that, for a considerable period of time, it is possible for a reserve enemy team of attacking swimmers to perform their destructive mission undetected. Moreover, swimmer surveillance and other sonars are blinded thereby, natural sea life is destroyed, and perhaps other defensive or tactical operations are adversely affected.

SUMMARY OF THE INVENTION

The instant invention overcomes many of the disadvantages of the prior art method and means heretofore used to defend against attacking swimmers, in that the operational results thereof are more effective, without the deleterious side effects being present or effected, because projectiles and shock waves are aimed and shot thereat.

It is, therefore, an object of this invention to provide an improved defense against attacking swimmers.

Another object of this invention is to provide an improved method and means of neutralizing or disabling attacking covert swimmers, without producing unwanted side effects which adversely affect continuous swimmer search or surveillance, other sonar operations, or tactical dispositions or maneuvers.

Still another object of this invention is to provide an improved method and means for defending and protecting ships and other marine vehicles, as well as other underwater objects, from the clandestine attack of humans or other life forms.

A further object of this invention is to provide an improved underwater weapon system.

Another object of this invention is to provide an improved method and means of destroying or disabling an attacking target, regardless of the environmental medium within which it is operating.

Other objects and many of the attendant advantages will be readily appreciated as the subject invention becomes better understood by reference to the following detailed description, when considered in conjunction with the accompanying drawings.

Although the preferred embodiment of the subject invention is disclosed herewith as being an underwater weapon which disables attacking swimmers, it should be understood that with appropriate design changes—changes that would be obvious to one skilled in the art having the benefit of the teachings presented herewith—it may be operated in any predetermined environment to disable or destroy any type of attacking target.

BRIEF DESCRIPTION OF DRAWING

FIG. 2 is a quasi-pictorial disclosure of how the invention of FIG. 1 may be employed within an aqueous medium against covert attacking swimmers; and FIG. 3 is a pictorial view of a preferred embodiment of the target search vehicle used in weapon systems of FIGS. 1 and 2.

DESCRIPTION OF PREFERRED EMBODIMENT

Figure 1:
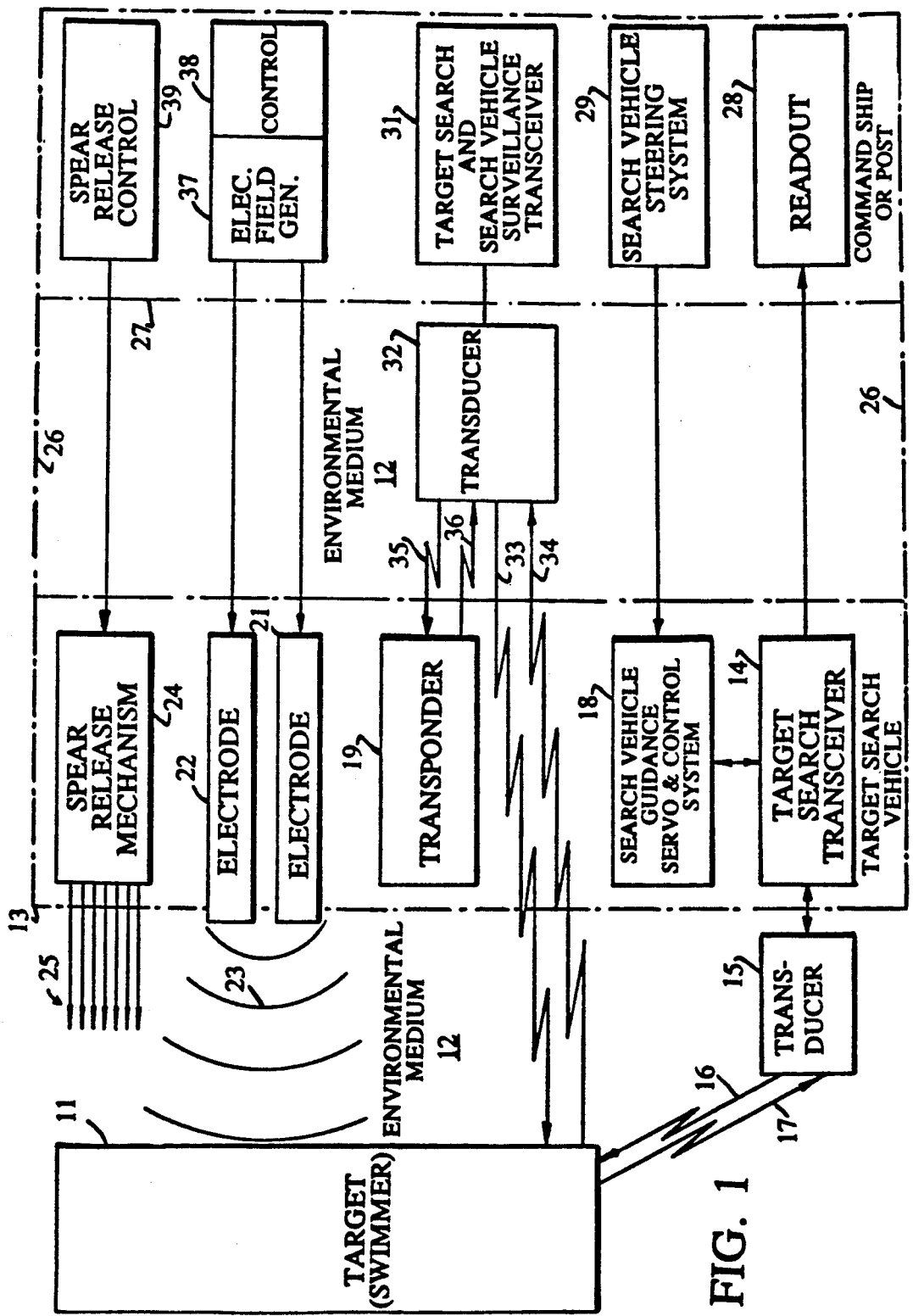
FIG. 1 is a functional block diagram of the weapon system constituting the subject invention.

Referring now to FIG. 1, there is depicted a general disclosure of the system constituting this invention, and included therein is an attacking target 11 which is disposed within a predetermined environmental medium 12. Likewise disposed in said environmental medium 12 is a powered target search and seeking vehicle 13 which, among other things, has such propellent and altitude control means incorporated therein that allows it to be mobile and guidable toward the aforesaid attacking target. The type of power, propellent, and control means employed would, of course, be determined by the environmental medium within which it is operating and the type of target which is being sought.

Disposed within target search vehicle 13 is a target search and seeking transceiver 14 which has a suitable transducer 15 connected thereto for broadcasting a target search signal 16 throughout environmental medium 12 and for receiving the echo signal 17 thereof reflected from target 11.

Also included in target search vehicle 13 is a search vehicle guidance servo and control system 18 which is adapted for being steered from a remote location by means which will be discussed in detail subsequently and/or means of the aforementioned target echo-search apparatus 14. For this purpose it is connected thereto, and for target search vehicle steering purposes, said remote steering means may be connected therethrough. Again, it should be understood that the type of guidance servo and control system selected and employed should be such as will meet the requirements necessary to perform its intended function within the ambient environment.

Also included in target search vehicle 13 is a transponder 19, which will broadcast a given signal in response to a predetermined received signal.

A pair of electrodes 21 and 22 are, likewise, included in vehicle 13 and are mounted in such manner that they are in contact with environmental medium 12. They are so designed that when electrically energized an electric field 23 is generated and broadcast in a given direction, which in actual operation will be toward the attacking target.

A spear release and impelling gun or mechanism 24 capable of being loaded with and shooting at least one and preferably a plurality of lethal spears 25, projectiles, or the like, is also mounted in target search vehicle 13. It should be so designed as to fire in response to a predetermined input signal, which is manually or otherwise supplied thereto.

All of the aforementioned components are directly connected by means of a suitable control cable 26 (which carries appropriate electrical conductors) to cooperating components remotely located on a command post or ship 27.

Located on said command post 27 is a readout 28 which is connected to the output of target search transceiver 14, a search vehicle steering system 29 which is connected to the input of search vehicle guidance servo and control system 18, and a target search and search vehicle surveillance transceiver 31 which is connected to a transducer 32 located in environmental medium 12. Of course, transducer 32 is a reversible transducer that is so designed as to broadcast target search signals 33 throughout environmental medium 12 and for receiving the echo signals 34 thereof that is reflected from target 11. In addition, it broadcasts interrogation signals 35 to transponder 19 and receives response signals 36 therefrom for the purpose of precisely locating target search vehicle 13 at all times during countermeasure operations.

Also mounted on command post 27 is an electric field generator 37 which is connected to the aforesaid electrodes 21 and 22 for electrical energization thereof. A control 38 for initiating and regulating electric field generator 37 is suitably connected thereto for such purpose. A spear release control 39 is likewise mounted thereon and is connected to the aforesaid spear release mechanism 24 for the timely firing of spears 25.

It should be understood that the respective interconnections of all of the components located on target search vehicle 13 and the components located on command post or ship 27 may be implemented by means of any suitable telemetering system; however, for most practical purposes, it has been found that an appropriate flexible coaxial cable is quite satisfactory for such purpose. Accordingly, to facilitate disclosing the subject invention in its simplest form, cable 26 is used.

MODE OF OPERATION

The operation of the invention will now be discussed briefly in conjunction with all of the figures of the drawing. However, to keep this disclosure of operation as simple as possible, reference herewith will be made primarily with respect to the operational situation disclosed in FIG. 2, inasmuch as the system of FIG. 1 is intended to be more generic in scope, as far as environmental medium, target, target search vehicle, and command post are concerned. However, since various and sundry preferred embodiments of the elements making up the system of FIG. 1 are also illustrated in FIG. 2, like reference numerals for like elements have been employed therein, insofar as it is practical to do so.

As shown in FIGS. 1 and 2, there is a swimmer 11 who is attacking a ship 27 (or possibly some other objective or ship—not shown—in the proximity thereof). Said attacking swimmer is discovered by means of target search sonar 31 which, as previously mentioned, broadcasts search signals 33 from transducer 32 and receives the echoes thereof from the attacking target, if such is present.

Once an attacking target is acquired, target search vehicle 13 is launched and guided toward it by means of guidance servo and control system 18 and steering system 29 interconnected by cable 26, with the help of sonar 31 and transponder 19. But once vehicle 13 gets into close enough range for target echo-search transceiver or sonars 14 located therein to acquire target swimmer 11, it then becomes the sonar which is monitored at readout 28, so that vehicle 13 can be very accurately guided to a position of close proximity with said target to facilitate the shooting thereof. Hence, by such procedure, the weapons constituting electrodes 21 and 22 and spear release mechanism 24 and spears 25 are placed in an optimum position to shoot at attacking target 11, without his being aware that he is being counterattacked. At such time, the human operator on board ship 27 decided whether to use the electromagnetic field shock treatment, or to fire the spears, or do both, in order to disable or destroy the attacking swimmer. As a general rule of thumb, if the exact location of the target is somewhat questionable due to the water being muddy, or turbulent, or the like, the electric field will be used first because it acts as a "shotgun" type of attack, which has a rather broad lethal firing spectrum. On the other hand, if the "sighting" of the target is good, the spears may be shot toward him because they may be more devastating under such circumstances.

To employ the electric field defense merely requires that control 38 be manually manipulated to effect generation of an electric field by generator 37, which is then shot toward the target by electrodes 21 and 22.

On the other hand, to employ the spears defense, spear release control 39 is merely triggered by the human operator, which, in turn, causes spear release mechanism 24 to about spears 25 toward the target.

FIG. 3 discloses a typical powered target search vehicle that may be incorporated in the subject invention, especially if the operational environmental medium is water. Obviously, the actual type of search vehicle employed would be determined by its intended use, as well as the aforesaid environmental medium. Making the proper selection thereof, of course, would be well within the purview of one skilled in the art having the benefit of the teachings herewith presented, and, therefore, it should be understood that it is not intended that the subject invention be limited thereto.

In this particular instance, vehicle 13—as depicted in FIG. 3—is torpedo like in shape and may, if desired, have a similar propulsion system, stabilization, and altitude control apparatus, and the like. It shoots electrical field energy by means of electrodes 21 and 22, and it shoots spears 25 in a forwardly direction from front end or nose section 41 thereof. Also, target echo-search sonar 14 broadcasts and receives its signals from suitable transducer apparatus 15 disposed in the nose section thereof.

If desired for the purpose of making vehicle 13 as streamlined as possible, the external surfaces may be appropriately sectionalized to act as transducers for control or location purposes. In such case, they would obviously be separated by a suitable dielectric material. And, of course, other elements such as eye 42 may be mounted thereon to make the handling thereof easier by crane or other compatible launching device located on ship 27.

All of the foregoing elements of this invention which are respectively represented in block or symbolic form in the various figures as well known and conventional per se; therefore, it is to be understood that it is their unique interconnections and interactions that effect the method and means constituting this invention and the new and improved results produced thereby.

Obviously, other embodiments and modifications of the subject invention will readily come to the mind of one skilled in the art having the benefit of the teachings presented in the description and drawings of this case. It is, therefore, to be understood that this invention is not to be limited thereto and that said modifications and embodiments are intended to be included within the scope thereof.

What is claimed is:

1. An attacking target surveillance and destruct system, comprising in combination:
   a first vehicle;
   a second vehicle capable of being launched from said first vehicle and running under its own power within a predetermined environmental medium;
   means mounted on said second vehicle for searching for and seeking a predetermined target that is disposed within said predetermined environmental medium;
   means mounted on said second vehicle and connected to one of the outputs of said target searching and seeking means for guiding said second vehicle toward said target;
   a transponder mounted on said second vehicle;
   means mounted on said second vehicle for broadcasting an electric field substantially ahead thereof within said predetermined environmental medium in response to electrical energy supplied thereto;
   means mounted on said second vehicle for shooting a plurality of spears ahead thereof within said predetermined environmental medium in response to a trigger signal;
   means mounted on said first vehicle for searching for and continuously monitoring the location of said target within said predetermined environmental medium and for monitoring the location of said second vehicle relative to said target, so as to timely effect the guidance of said second vehicle toward said target as a result of the actuation of and response to the aforesaid transponder thereby;
   controllable means mounted on said first vehicle and connected to said electrical field broadcasting means for timely supplying electrical energy thereto; and
   means mounted on said first vehicle and connected to the aforesaid spear shooting means for timely supplying said trigger signal thereto.

2. The invention of claim 1 further characterized by means mounted on said first vehicle and connected to an output of said target searching and seeking means for reading out target search and disposition data thereat.

3. The invention of claim 1 further characterized by a steering system mounted on said first vehicle and connected to said second vehicle guiding means for steering said second vehicle as desired within the aforesaid predetermined environmental medium.

4. The invention of claim 3 further characterized by means mounted on said first vehicle and connected to an output of said target searching and seeking means for reading out target search and disposition data thereat.

5. The device of claim 1 wherein said first vehicle is a ship.

6. The device of claim 1 wherein said first vehicle is a predetermined command post.

7. The device of claim 1 wherein said predetermined environmental medium is water.

8. The device of claim 1 wherein said second vehicle is an underwater vehicle.

9. The device of claim 1 wherein said means mounted on said second vehicle for searching for and seeking a predetermined target that is disposed within said predetermined environmental medium comprises a sonar system.

10. The device of claim 1 wherein said means mounted on said second vehicle for broadcasting an electric field substantially ahead thereof within said predetermined environmental medium in response to electric energy supplied thereto comprises a plurality of electrodes.

11. The device of claim 1 wherein said means mounted on said second vehicle for shooting a plurality of spears ahead thereof within said predetermined environmental medium in response to a trigger signal comprises a spear release and impelling mechanism.

12. The device of claim 1 wherein said means mounted on said first vehicle for searching for and continuously monitoring the location of said target within said predetermined environmental medium and for monitoring the location of said second vehicle relative to said target, so as to timely effect the guidance of said second vehicle toward said target as a result of the actuation of and response to the aforesaid transponder thereby comprises a sonar system.

13. The device of claim 1 wherein said controllable means mounted on said first vehicle and connected to said electrical field broadcasting means for timely supplying electrical energy thereto comprises:
   an electrical field generator; and
   a control means connected to said electrical field generator for timely initiating and discontinuing the electrical energy produced thereby.

14. The device of claim 1 wherein said means mounted on said first vehicle and connected to the aforesaid spear shooting means for timely supplying said trigger signal thereto comprises a spear release control mechanism.

* * * * *